(12) United States Patent
Mehner

(10) Patent No.: US 10,594,716 B2
(45) Date of Patent: Mar. 17, 2020

(54) SYSTEM AND METHOD FOR DETECTING COMPUTER NETWORK INTRUSIONS

(71) Applicant: Connecticut Information Security LLC, Wilton, CT (US)

(72) Inventor: Sean Murray Mehner, Redding, CT (US)

(73) Assignee: CONNECTICUT INFORMATION SECURITY LLC, Wilton, CT (US)

( * ) Notice: Subject to any disclaimer, the term of this patent is extended or adjusted under 35 U.S.C. 154(b) by 212 days.

(21) Appl. No.: 15/881,193

(22) Filed: Jan. 26, 2018

(65) Prior Publication Data

US 2019/0238570 A1    Aug. 1, 2019

(51) Int. Cl.
*H04L 29/06* (2006.01)
*G06F 9/4401* (2018.01)
*G06F 21/55* (2013.01)

(52) U.S. Cl.
CPC .......... *H04L 63/1425* (2013.01); *G06F 9/442* (2013.01); *G06F 9/4406* (2013.01); *G06F 21/55* (2013.01); *H04L 63/1416* (2013.01); *H04L 63/1441* (2013.01); *H04L 63/083* (2013.01)

(58) Field of Classification Search
CPC ............. H04L 63/1425; H04L 63/1416; H04L 63/1441; H04L 63/083; G06F 9/4406; G06F 9/442; G06F 21/55
USPC ......................................................... 726/23
See application file for complete search history.

(56) References Cited

U.S. PATENT DOCUMENTS

| | | | | |
|---|---|---|---|---|
| 5,953,502 A | * | 9/1999 | Helbig, Sr. ........... | G06F 9/3879 712/E9.067 |
| 2004/0054901 A1 | * | 3/2004 | England ................ | H04L 63/12 713/168 |
| 2010/0037312 A1 | * | 2/2010 | Tarkhanyan ........... | G06F 21/57 726/16 |
| 2013/0232338 A1 | * | 9/2013 | Byres ................... | H04L 41/0806 713/162 |

* cited by examiner

*Primary Examiner* — Michael S McNally
(74) *Attorney, Agent, or Firm* — Seth H. Ostrow, Esq.; Meister Seelig & Fein LLP

(57) ABSTRACT

A method and system for monitoring computer network intrusions, the system comprising at least one security device including a processor and memory. The at least one security device is communicatively coupled to a private network and configured to generate heartbeat pulses comprising operational snapshots of the at least one security device. The system further comprises one or more host systems configured to communicate with the at least one security device from an external network, transmit configuration parameters to the at least one security device, the configuration parameters including instructions for the at least one security device to operate as a given type of network asset, monitor the heartbeat pulse of the at least one security device, determine a change in integrity in the at least one security device based on the monitoring, and send one or more notification messages to a network administrator based on the determination.

29 Claims, 5 Drawing Sheets

SYSTEM AND METHOD FOR DETECTING COMPUTER NETWORK INTRUSIONS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This application generally relates to computer network security, and in particular, a system that configures honeypot devices to detect and respond to unauthorized access to information assets.

Attacks originating internally as well as externally from a computer network occur daily, but the ability to detect more aggressive targeted methods is usually difficult for even the most well-developed organizations. Although many enterprise security teams have implemented next generation firewalls, deep-packet inspection, anomaly detection, heuristics, data loss prevention, event correlation as well as many other technologies, there is still a gap within the coverage. Most of these technologies rely upon traffic crossing a device that will log an event. Such traffic may be referred to as North/South traffic, but generally speaking, East/West or lateral traffic is usually not captured between two hosts on the inside of a network. As a result, once an attacker has successfully gained access to a network, most of the attacker's actions afterwards will go undetected. Furthermore, the ability to detect internal attacks is often lacking and prone to false positives.

Existing honeypot technologies address this problem through the use of deception. By creating decoy targets, and enticing malicious users to them through open services and the potential for valuable data, security teams are able to root out illegitimate traffic and users quickly. When a connection is made to a honeypot, it is known that the action is not from a legitimate user, and thus, making the rate of false positives very low. This field has existed in computing for decades, but as the threats have evolved, so to must the security layers and implementations.

SUMMARY OF THE INVENTION

Methods and computing systems are disclosed. According to one embodiment, the system comprises at least one security device including a processor and memory. The at least one security device is communicatively coupled to a private network and configured to generate heartbeat pulses comprising operational snapshots of the at least one security device. The system further comprises one or more host systems configured to communicate with the at least one security device from an external network, transmit configuration parameters to the at least one security device, the configuration parameters including instructions for the at least one security device to operate as a given type of network asset, monitor the heartbeat pulse of the at least one security device, determine a change in integrity in the at least one security device based on the monitoring, and send one or more notification messages to a network administrator based on the determination.

The at least one security device may be further configured to detect intrusion events based on the configuration parameters and determine an occurrence of attack based on file changes or execution of one or more system binaries associated with the intrusion events.

According to one embodiment, a method for managing computer network intrusions comprises configuring, by a host system including at least one processor and a memory, a security device in a network by transmitting configuration parameters to the security device, where the configuration parameters include instructions for the security device to operate as a given type of network asset. The security device is monitored by the host system retrieving and analyzing a heartbeat pulse of the security device, where the heartbeat pulse comprises an operational snapshot of the security device. A change in integrity in the security device is determined by the host system based on the monitoring. The method further comprises sending, by the host system, one or more notification messages to a network administrator based on the determination.

The given type of network asset for which the security device is to operate may be any one of a workstation, a server, or a network-attached device. Additionally, the configuration parameters may include one or more of an operating system, a file system structure, port mappings, local credentials, communication protocols, encryption keys, and security routines. The heartbeat pulse may include a report of device status, activities, and conditions. A report with device status may include a client identifier, a device identifier, a system or configuration file version, a timestamp, device health status, drive space, uptime, a MAC address, and an IP address. A report with activities and conditions includes a comparison of a hash of passwords and shadow files of the security device with a prior hash of the passwords and shadow files, disk utilization, a comparison of a hash of files in a filesystem of the security device with a prior hash of the files in the filesystem, a record of logins, central processing unit utilization, and memory utilization. In another embodiment, an absence of the heartbeat from the security device may be determined by the host system and the host system may identify an issue with the security device based on the determined absence of the heartbeat from the security device.

According to one embodiment, a method for responding to computer network intrusions comprises receiving, by a data processing device including a processor and memory, configuration parameters from a host system, where the configuration parameters include instructions for the data processing device to operate as a given type of network asset. A heartbeat pulse is generated by creating an operational snapshot of the data processing device and transmitting the operational snapshot to the host system. Intrusion events are detected by the data processing device based on the configuration parameters. A notification of the intrusion events is transmitted by the data processing device to the host system. The method further comprises determining, by the data processing device, an occurrence of attack associated with the intrusion events, and initiating, by the data processing device, one or more protective measures.

The protective measures may include one or more of entering into an isolation state, shutting down, and rebooting to a default state. The configuration parameters may include instructions for the data processing device to operate as any one of a workstation, a server, or other network-attached devices. The configuration parameters may include one or more of an operating system, a file system structure, port mappings, local credentials, communication protocols, encryption keys, and security routines. Generating the heartbeat pulse may further comprise generating, by the data processing device, a report of device status, activities, and conditions. In one embodiment, generating a report of device status, activities, and conditions further comprises determining, by the data processing device, a client identifier, a device identifier, a system or configuration file version, a timestamp, device health status, drive space, uptime, a MAC address, and an IP address of the data processing device. In another embodiment, generating a report of device status, activities, and conditions further comprises comparing a hash of passwords and shadow files of the data processing device with a prior hash of the passwords and shadow files, determining disk utilization of the data processing device, comparing a hash of files in a filesystem of the data processing device with a prior hash of the files in the filesystem, retrieving a record of logins, determining central processing unit utilization of the data processing device, and determining memory utilization of the data processing device.

The configuration parameters may also include intrusion detection signatures and honeypot detection mechanisms. In another embodiment, the configuration parameters include one or more system binaries that trigger the protective measures. Determining the occurrence of attack associated with the intrusion events may further comprise detecting the execution of the one or more system binaries. Alternatively, determining the occurrence of attack associated with the intrusion events further comprises analyzing file changes associated with the intrusion events.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
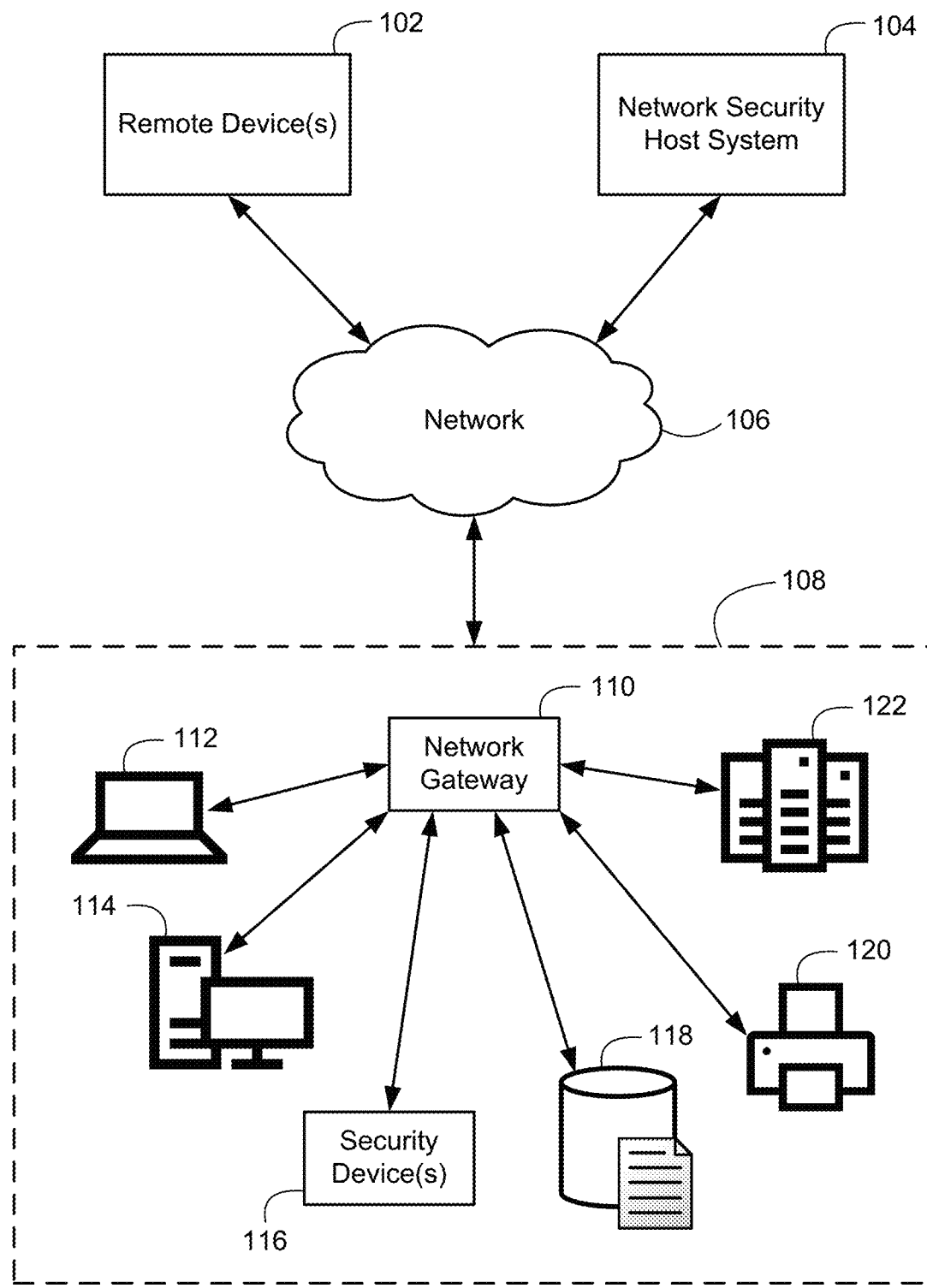
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses a system and method for deploying honeypots within an internal computer network environment that can be managed from a remote or centralized system. A "honeypot" is generally comprised of a system or computer mechanism including resources, such as devices, applications, and data that simulate the behavior of a real system. Honeypots can be placed in a production network in the role of a decoy or trap to detect and/or counteract the unauthorized use of information technology resources. Honeypot resources may be either fictional or resources that do not need to be protected. Thus, a honeypot consists of resources that appear to be part of a network that is being attacked, and thus appears to contain information or resources that are of value to malicious users, but is actually isolated from the real resources.

Honeypots may be configured by network administrators to be attractive to malicious users so that they will be exploited. When malicious users exploit a honeypot, their attention may be turned away from other, legitimate resources. By creating decoy hosts or targets, and enticing malicious users to them through open services and the potential to gather valuable data, security teams are able to root out illegitimate traffic and users quickly and with low error rates as it is unlikely for legitimate users to access the honeypot. Moreover, access and communication by the malicious user with respect to the honeypot may be recorded and analyzed, thereby allowing network administrators to gain information about the malicious user. Viewing and logging activity of the honeypot can provide an insight into the level and types of threat a network infrastructure faces while distracting malicious users from assets of real value.

FIG. 1 presents a diagram of a computing system according to an embodiment. The illustrated system can be implemented to detect and observe suspicious user interactions with monitored resources. In some cases, suspicious user interactions may include a variety of attempts by a user to access resources that would not normally be accessed by authorized users. Suspicious user interactions may also include activities from devices infected with malware that performs various unauthorized/undesirable actions to monitored resources.

The system presented in FIG. 1 includes one or more remote devices 102, network security host system 104, network 106, and a private network 108. Private network 108 includes various devices 110-122, shown as a network gateway 110, a laptop computer 112, a workstation computer 114, one or more security devices 116, a file database 118, a printer 120, and servers 122. Network gateway 110 may comprise a network routing device that connects private network 108 (and its devices) to network 106. The network gateway 110 may allow any of the devices within private network 108 to communicate externally with network security host system 104 and the one or more remote devices 102 through network 106. In one embodiment, the network 106 may be the Internet, following known Internet protocols for data communication, or any other communication network, e.g., any wide area network (WAN) connection, cellular network, wire-line type connections, wireless type connections, or any combination thereof.

One or more security devices 116 may comprise hardware, software, or a combination thereof that can be installed in private network 108 and customized to help identify users or attackers who may be traversing private network 108. A security device may be any computing device having a central processing unit and memory unit capable of connecting to a network (e.g., desktop computers, terminals, laptops, single-board computers, personal digital assistants (PDA), cellular phones, smartphones, tablet computers, e-book readers, smart watches and wearable devices, etc.). A client device may vary in terms of capabilities or features. For example, a security device may include a processor, memory, a network interface controller, Bluetooth® and 802.11 wireless hardware, a display interface, input and output ports, storage devices, etc. One or more security devices 116 may also include or execute a variety of operating systems, including a personal computer operating system, such as a Windows, Mac OS or Linux, or a mobile operating system, such as iOS, Android, or Windows Phone, or the like. The one or more security devices 116 may include security mechanisms such as intrusion detection signatures in addition to honeypot detection mechanisms that can detect, deflect, or, in some manner, counteract attempts at attacks and probes.

According to one embodiment, the one or more security devices 116 may be configured, maintained, monitored, and managed via network security host system 104. Network security host system 104 may include one or more servers including at least one or more central processing units and memory. According to one embodiment, network security host system 104 may comprise a cloud computing hosted environment. Cloud computing may generally refer to a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Settings and host details of the one or more security devices 116 may be accessed remotely by network administrators via a centralized management console.

Upon connection to private network 108 or device startup, the one or more security devices 116 may register with network security host system 104 for activation by communicating its timestamp, device/node name, Internet Protocol (IP) address, and media access control (MAC) address. Communications between one or more security devices 116 and network security host system 104 may be secured, for example, by using client-server authentication using Transport Layer Security (TLS), Hypertext Transfer Protocol (HTTP) Strict Transport Security (HSTS), and Rivest-Shamir-Adlema (RSA) public/private key encryption, or any other encryption standard known in the art. Each security device may be provisioned by network security host system 104 with a user-configurable environmental file. Provisioned security devices may replicate devices and device services for specific types of devices (e.g., desktop computer, server computer, medical device, etc.). The one or more security devices 116 may be configured as clones by pointing at a device and cloning the network services of target devices. According to one embodiment, network security host system 104 may configure the one or more security devices 116 with configuration parameters including an operating system, file system structure, port mappings, local credentials, communication protocols, encryption keys for secured communication, and security routines for performing device health checks, reporting, monitoring for intrusion, intrusion response, and device updating (e.g., operating system updates, device configurations, code updates, key cycling, and whitelisting). Local credentials distributed among the one or more security devices 116 may be device-specific to prevent common access to all devices.

The one or more security devices 116 include native functionalities (e.g., operating systems and security routines) in addition to cloned files or services and may appear on the private network 108 as common or specific network assets, e.g., workstation, server, or any other network-attached device. One or more security devices 116 may advertise default services (e.g., Secure Shell (SSH), Domain Name System (DNS), HTTP) or those of a specific cloned target using generic socket listeners. The one or more security devices 116 may lay dormant until they are accessed or probed. When an intrusion event is detected by a given security device, an alert may be sent to a network administrator outlining the details of the event. For example, upon a scan or probe on the given device, details of the attacker (action taken, IP address of the attacker, etc.) may be captured in real-time and sent as messages, such as an email or syslog, to a network administrator for action, such as investigating or blocking the IP address of the attacker. Irregularities in the operating system or the native functionalities of the given security device may alert administrators and result in isolation/shutdown of the given security device. If the given security device is further probed or compromised, the security device may put itself into isolation and reboot to a default state (or re-provisioned).

Figure 2:
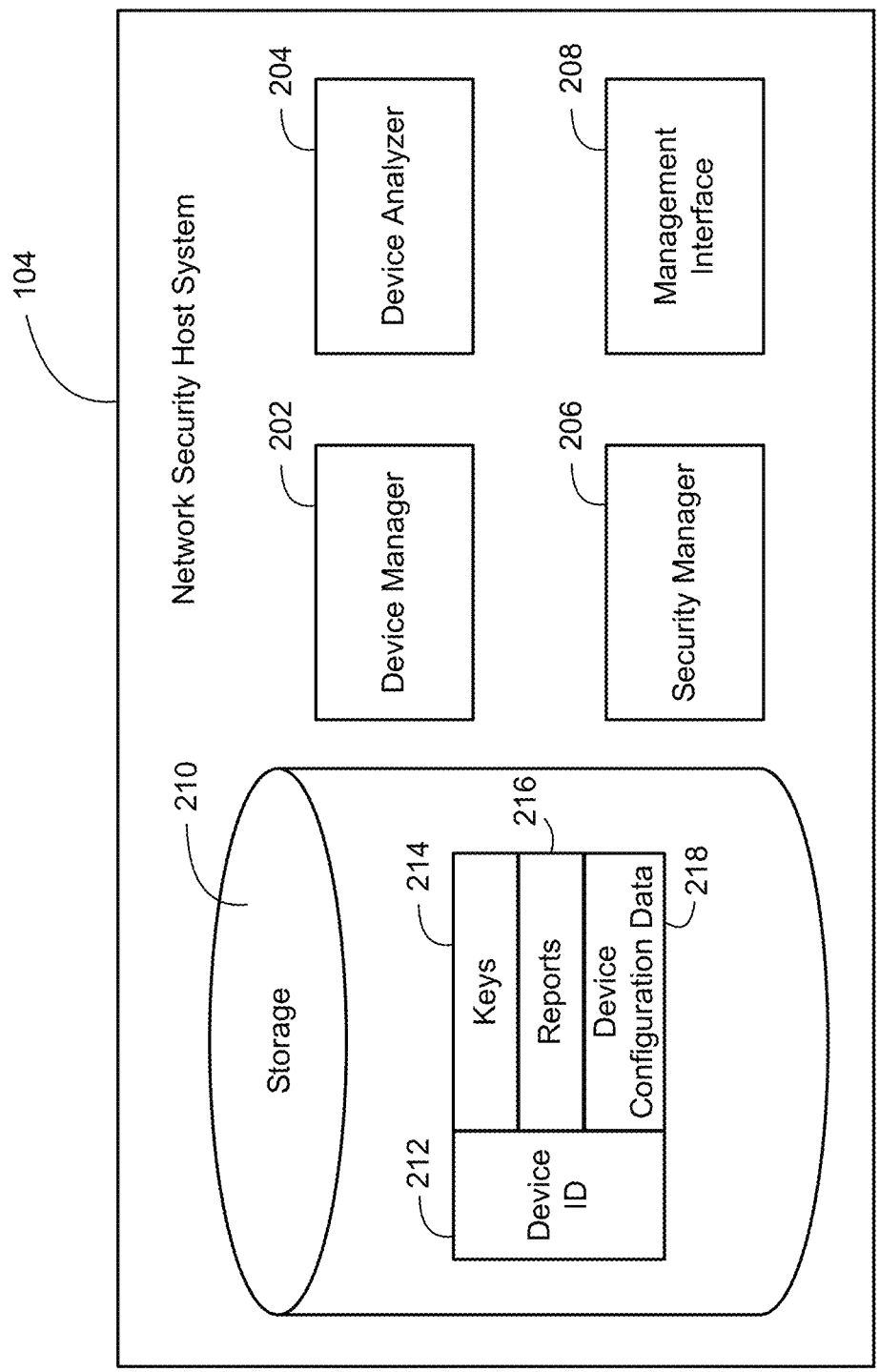
FIG. 2 illustrates a block diagram of a network security host system according to an embodiment of the present invention.

FIG. 2 presents a block diagram of a network security host system according to an embodiment of the present invention. According to certain embodiments, components illustrated in FIG. 2 may be distributed among a plurality of servers to prevent a direct path from security devices to backend resources and adds a level of protection against network security host system 104 from being comprised through direct attacks. Network security host system 104 includes device manager 202, device analyzer 204, security manager 206, management interface 208, and storage 210. Device manager 202 may configure, manage and update security devices. Security devices may be initialized by the device manager 202 by loading image files to the security devices and configuring them as clone devices in a default or initial state. According to one embodiment, device manager 202 may clone or replicate a given node of a specific IP address. An image of the node may be created or retrieved and loaded to a security device.

Security devices installed on a monitored private network may register with device manager 202 to be configured with network security host system 104. Registering a security device may include creating a filesystem including folder directories corresponding to a device ID 212 of the security device in storage 210. Keys 214, reports 216, and device configuration data 218 may comprise subfolders of device ID 212. The filesystem may be used to facilitate information exchange or communication between the security device and network security host system 104. That is, network security host system 104 may periodically monitor files for pickup from storage 210. The files may be dropped off in storage 210 by security devices. Security devices may also periodically monitor for files loaded to storage 210 by network security host system 104 for retrieval.

Security devices may be given a public/private key pair by security manager 206 to communicate and retrieve files from network security host system 104. The public/private key pair may be stored in keys 214. Security manager 206 may manage the public/private key pairs for authenticating (e.g., SSH) and transferring files (e.g., over a TLS tunnel) from storage 210. For example, files stored in storage 210 by network security host system 104 may be encrypted using a client public key or a random key that is encrypted using the client public key. Retrieving the stored files by security devices may include decrypting the files or the random key with client private keys that are specific to each of the security devices. On the other hand, files stored in storage 210 by security devices may be encrypted using a server public key and signed by client private keys that are specific to each the security devices. The signature of the files stored by security devices can be verified by network security host system 104 using the client public key and the files may be decrypted using the client private keys. Security manager 206 may re-provision the server and client keys in the event of a compromise or redeployment of a security device.

Configuration files may be periodically created by device manager 202 for updating or patching security devices. The configuration files may include system files, key configurations, whitelisting, security routines, and MAC address assignments. The configuration files may be specifically created for each security device (e.g., depending on their functionalities and services) and loaded to device configuration data 218 in respective folders corresponding to the security devices. A package or file may be placed in a given device folder directory indicating a path to the payload. Security devices may monitor the device configuration data 218 and check if configuration files exist in their respective folders, and if so, retrieve them for installation. Configuration files that have been retrieved by security devices may be deleted from device configuration data 218.

Security devices may transmit heartbeat pulses including a report of device status, activities, and conditions along with messages to storage 210 for storage in reports 216. Device status may include a client identifier, a device identifier, a system or configuration file version, a timestamp, device health status, drive space, uptime, a MAC address, and an IP address. Device activities and conditions may include testing: a hash of passwords and shadow files compared against prior hashes, disk utilization, a hash of files in the filesystem compared against prior hashes, records of logins, central processing unit (CPU) utilization, and memory utilization. The device activities and conditions may also include thresholds and warnings from the testing. Device analyzer 204 may periodically retrieve the report from reports 216 to process and determine if any security devices have irregularities. Network security host system 104 may also request device activities and conditions on demand if security devices are suspected of being compromised or have encountered other issues. Warnings and thresholds may be reported via messages or email alerts to a network administrator. Device analyzer 204 may also determine and generate warnings when heartbeat pulses are missing from security devices.

A network administrator may access summary and details of security devices via management interface 208. The management interface 208 may generate a user interface that includes a health status of the security devices and an option to view the report. The health status of a given security device may be determined based on an aggregate of device activities and conditions for the given security. Devices may be displayed in colors representative of their health status. For example, devices appearing in green may indicate a normal operation status, devices appearing in yellow may indicate an elevated status, and devices appearing in red may indicate a critical operation status. Additionally, the interface may be configured to vary the number of seconds between screen refreshes, and display a snapshot or constant monitoring of health status. A plurality of security devices may be displayed and filtered, e.g., by severity, device or client identifier, and overdue health status.

Figure 3:
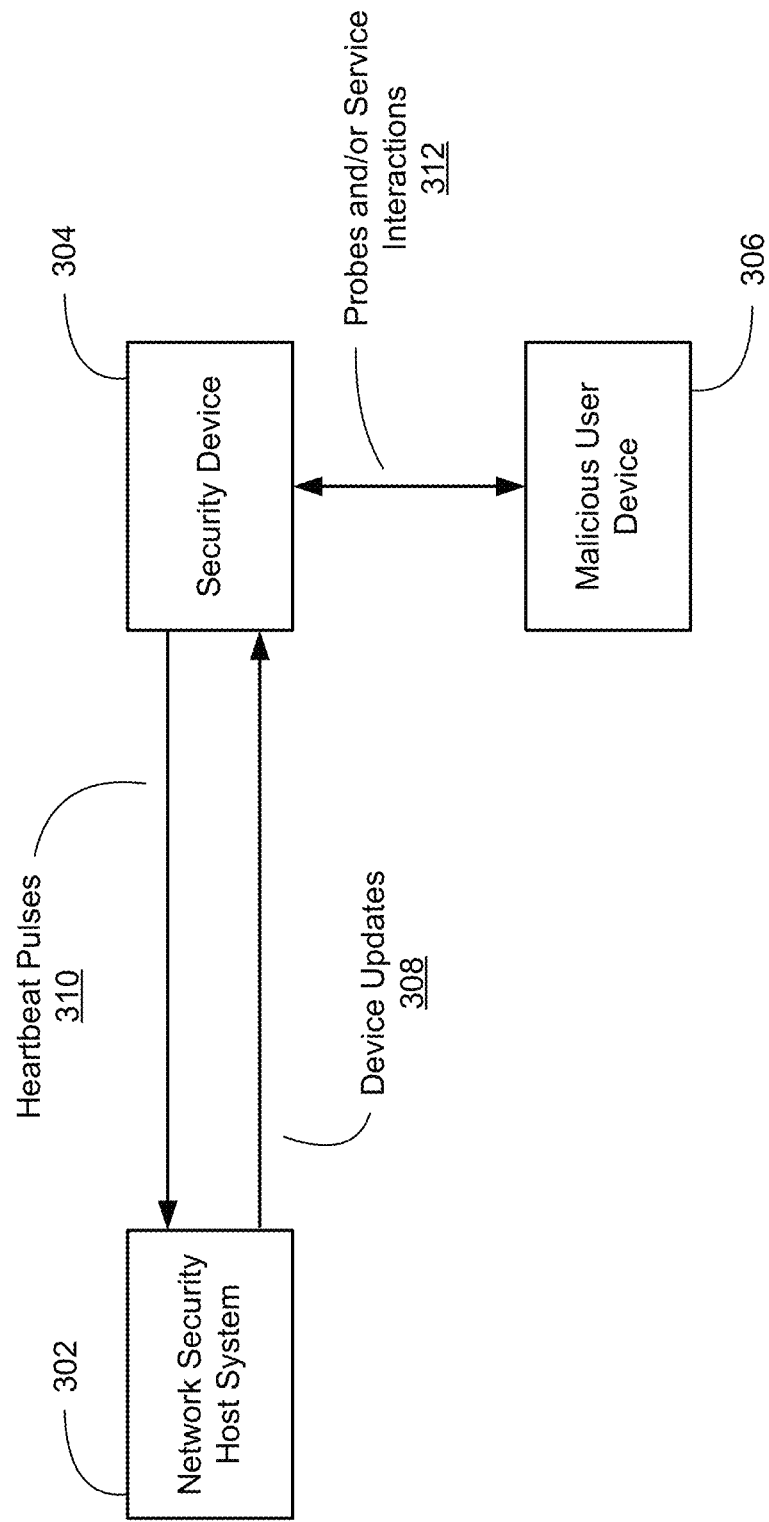
FIG. 3 illustrates a data flow diagram of a computing system according to an embodiment of the present invention.

FIG. 3 presents a data flow diagram of a computing system according to an embodiment of the present invention. A security device 304 may include hardware and/or software that can be remotely configured by network security host system 302 to emulate certain device characteristics and services as desired by, for example, a network administrator. The security device 304 may be installed or deployed within a private network, such as an enterprise network. The security device 304 may be further configured to periodically perform period health checks on itself to indicate that they are up and running and in proper working condition. The health checks may be used to generate and transmit heartbeat pulses 310 to network security host system 302. Heartbeat pulses 310 can be conducted periodically to provide an operational snapshot of security device 304 and alert to any integrity changes in security device 304. Heartbeat pulses 310 may include a report of device status, activities, and conditions. The heartbeat pulses 310 can be used to notify the network security host system 302 of an intrusion or unauthorized access to security device 304.

According to one embodiment, security device 304 may 'check in' with its status reporting elements such as disk and CPU utilization to ensure proper uptime. Each check may have a threshold and associated value. As the threshold reaches a higher level, health of the security device 304 indicated in its report may decrease or worsen. In another embodiment, devices operating under normal thresholds may be indicated with a temperature of 98.6° F., representative of normal human temperature, where those with elevated thresholds may be indicated with higher temperatures (e.g., to indicate a fever, sickness, etc.). Security device 304 may sign the heartbeat pulses 310 with a client private key, encrypt it with a server public key, and post it to network security host system 302, e.g., via a PHP call. The network security host system 302 may validate the encryption, and proceeds to perform a series of additional checks, such as size, file name and type, and content before processing.

The operating system and system components of security device 304 may be monitored for additional security risks. As patches to the operating system and system components are made available, they may be evaluated and deployed (updates 308) by network security host system 302 to security device 304. Updates 308 may include operating system updates, device configurations, routine/code updates, key cycling, whitelisting, etc. The updates 308 may be retrieved by security device 304 or pushed from network security host system 302 periodically or as needed at any time.

Malicious user device 306 may attempt to access, probe, or attack security device 304 via probes and/or service interactions 312, either remotely or internally from within the private network. The security device 304 may include security mechanisms such as intrusion detection signatures and honeypot detection mechanisms that can detect probes and/or service interactions 312. Real-time intrusion alerts can be emailed, sent to a syslog server, or otherwise transmitted by security device 304 for immediate action. Alerts may include the IP address of malicious user device 306 as well as the requests or content sent in the probes and/or service interactions 312.

Upon detection of an attack as a result of probes and/or service interactions 312, security device 304 may further take protective measures. Attacks may be detected based on an analysis of file changes associated with the probes and/or service interfaces 312 as well as system binaries (e.g., configurated by the network security host system) altered to trigger the protective measures upon execution. For example, if an attacker attempts to use "booby trapped" functions such as "whois," the security device can be triggered into protective measures. Protective measures may include one or more of: entering into an isolation state, shutting down, and forcing itself to reboot to a default configuration or state. Additionally, network security host system 302 can create a new MAC address for the security device 304. This may effectively "recycle" the security device as a new device or asset.

Figure 4:
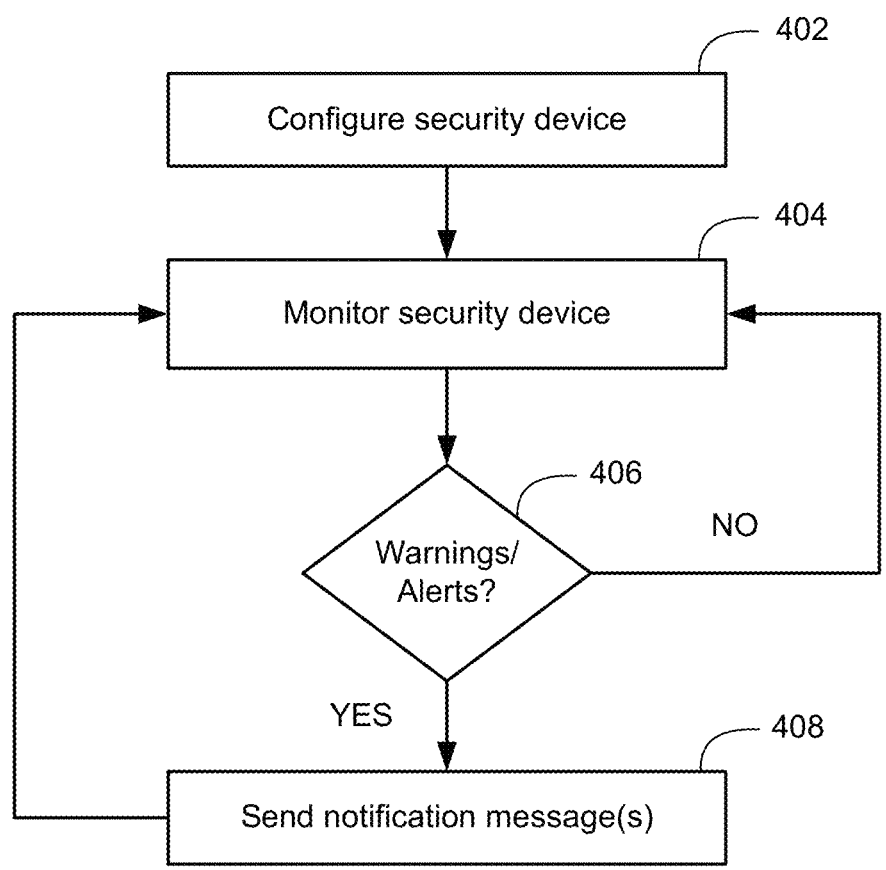
FIG. 4 illustrates a flowchart of a method for managing computer network intrusions according to an embodiment of the present invention.

FIG. 4 illustrates a flowchart of a method for managing computer network intrusions according to an embodiment of the present invention. A security device is configured by a network security host system, step 402. The security device may comprise hardware, software, or a combination thereof that can be installed and connected to a private network. Configuring the security device may include transmitting configuration parameters to the security device to instruct and define its operations as a specific type of network asset, e.g., workstation, server, medical device, etc., and offering specific or generic services. For example, the secure device may be configured as a clone of a target device. The configuration parameters may include an operating system, file system structure, port mappings, local credentials, communication protocols, encryption keys, and security routines for performing device health checks, reporting, monitoring for intrusion, intrusion response, and device updating. The security routines may include security mechanisms such as intrusion detection signatures and honeypot detection mechanisms that can detect probes and/or service interactions.

The security device is monitored, step 404. Monitoring the security device may include retrieving a heartbeat pulse and messages (if any). The security device may transmit the heartbeat pulse and messages to a storage location where the network security host system may retrieve the heartbeat pulse for analysis. Heartbeat pulses may provide an operational snapshot of the security device and alert to any integrity changes of the security device. The heartbeat pulse may include a report of device status, activities, and conditions. Device status may include a client identifier, a device identifier, a system or configuration file version, a timestamp, device health status, drive space, uptime, a MAC address, and an IP address. Device activities and conditions may include testing: a hash of passwords and shadow files compared against prior hashes, disk utilization, a hash of files in the filesystem compared against prior hashes, records of logins, central processing unit (CPU) utilization, and memory utilization. Monitoring the security device may further include analyzing a report of device status, activities, and conditions from the heartbeat to determine irregularities. The network security host system may determine if heartbeat pulses are missing from the security device which may indicate an issue with the security device.

The network security host system determines whether warnings or alerts should be issued based on the monitoring, step 406. If there are no warnings or alerts, the network security host system continues to monitor the security device in step 404. Otherwise, if the network security host system does indeed detect an integrity change in the security device from the heartbeat pulse, one or more notification messages are sent, step 408. For example, real-time alerts can be emailed, sent to a syslog server, or otherwise communicated to a network administrator. Alerts may include the nature of the integrity change.

Figure 5:
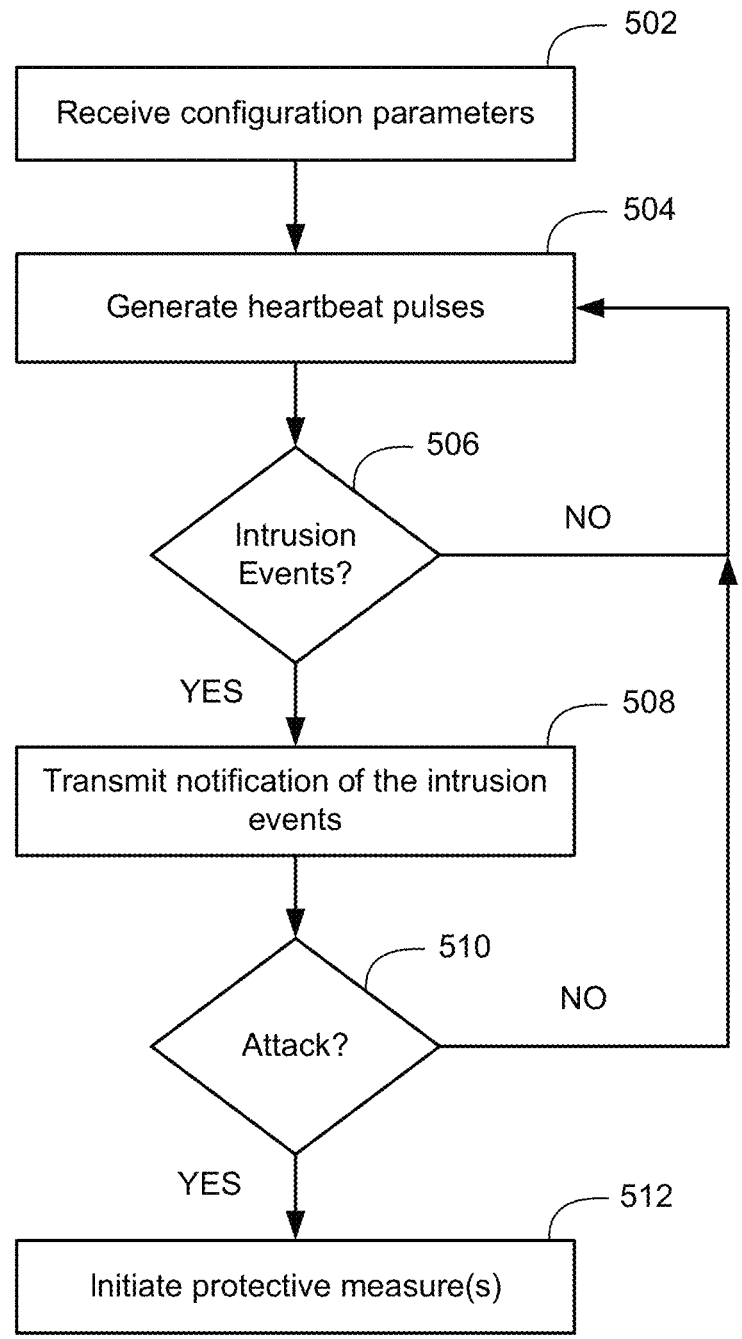
FIG. 5 illustrates a flowchart of a method for responding to computer network intrusions according to an embodiment of the present invention.

FIG. 5 illustrates a flowchart of a method for responding to computer network intrusions according to an embodiment of the present invention. Configuration parameters are received by a security device, step 502. The security device may receive configuration parameters from a network security host system for operating as a specific type of network asset, e.g., workstation, server, medical device, etc., and offering specific or generic services. The configuration parameters may include an operating system, file system structure, port mappings, local credentials, communication protocols, encryption keys, and security routines for performing device health checks, reporting, monitoring for intrusion, intrusion response, and device updating. The security routines may include security mechanisms such as intrusion detection signatures and honeypot detection mechanisms that can detect probes and/or service interactions.

A heartbeat pulse is generated, step 504. Generating a heartbeat pulse may include creating a report of device status, activities, and conditions, and transmitting the report to the network security host system. Device status may be determined from a client identifier, a device identifier, a system or configuration file version, a timestamp, device health status, uptime, a MAC address, and an IP address of the security device. Device activities and conditions may be determined by comparing a hash of passwords and shadow files with prior hashes, determining disk utilization, comparing a hash of files in the filesystem with prior hashes, retrieving records of logins, determining central processing unit (CPU) utilization, and determining memory utilization. The heartbeat pulses can be used to notify the network security host system of an intrusion or unauthorized access to the security device. Heartbeat pulses may be conducted periodically to provide an operational snapshot of the security device and alert to any integrity changes in the security device.

The security device monitors for intrusion events, step 506. Intrusion events may be determined by using intrusion detection signatures and honeypot detection mechanisms from the configuration parameters. If intrusion events are not detected by the security device, the security device will continue to generate heartbeat pulses in step 504. When intrusion events are detected by the security device, a notification of the intrusion events are transmitted, step 508. The notification may include an alert that can be sent to a network administrator outlining the details of the event. The notification may also be transmitted to the network security host system where it may further relay the message to predetermined user devices. The notification may be transmitted through various electronic communication means including email, syslog messages, text messages, etc.

The security device determines whether an attack is occurring associated with the intrusion events, step 510. Attacks may be detected based on an analysis of file changes associated with the intrusion events as well as system binaries (e.g., in the configuration parameters) altered to trigger the protective measures upon execution. If an attack is not detected by the security device, the security device will continue to generate heartbeat pulses in step 504. Upon detection of an attack, the security device will initiate one or more protective measures, step 512. Protective measures may include one or more of: entering into an isolation state, shutting down, and forcing itself to reboot to a default configuration or state.

FIGS. 1 through 5 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random-access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for monitoring computer network intrusions, the system comprising:
   at least one security device including a processor and memory, the at least one security device communicatively coupled to a private network and configured to generate heartbeat pulses comprising operational snapshots of the at least one security device, the heartbeat pulses including a report of device status, activities, and conditions, wherein the report includes a client identifier, a device identifier, a system or configuration file version, a timestamp, device health status, drive space, uptime, a MAC address, and an IP address; and
   one or more host systems configured to:
   communicate with the at least one security device from an external network;
   transmit configuration parameters to the at least one security device, the configuration parameters including instructions for the at least one security device to operate as a given type of network asset;
   monitor the heartbeat pulse of the at least one security device;
   determine a change in integrity in the at least one security device based on the monitoring; and
   send one or more notification messages to a network administrator based on the determination.

2. The system of claim 1 wherein the at least one security device is configured to:
   detect intrusion events based on the configuration parameters; and
   determine an occurrence of attack based on file changes or execution of one or more system binaries associated with the intrusion events.

3. A method for managing computer network intrusions, the method comprising:
   configuring, by a host system including at least one processor and a memory, a security device in a network by transmitting configuration parameters to the security device, the configuration parameters including instructions for the security device to operate as a given type of network asset;
   monitoring, by the host system, the security device by retrieving and analyzing a heartbeat pulse of the security device, the heartbeat pulse comprising an operational snapshot of the security device and including a report of device status, activities, and conditions, wherein the report includes a client identifier, a device identifier, a system or configuration file version, a timestamp, device health status, drive space, uptime, a MAC address, and an IP address;
   determining, by the host system, a change in integrity in the security device based on the monitoring;
   sending, by the host system, one or more notification messages to a network administrator based on the determination.

4. The method of claim 3 wherein the given type of network asset is selected from a group consisting of: a workstation, a server, and device network-attached device.

5. The method of claim 3 wherein the configuration parameters include one or more of an operating system, a file system structure, port mappings, local credentials, communication protocols, encryption keys, and security routines.

6. The method of claim 3 wherein the report includes a comparison of a hash of passwords and shadow files of the security device with a prior hash of the passwords and shadow files, disk utilization, a comparison of a hash of files in a filesystem of the security device with a prior hash of the files in the filesystem, a record of logins, central processing unit utilization, and memory utilization.

7. The method of claim 3 further comprising:
determining, by the host system, an absence of the heartbeat from the security device; and
identifying, by the host system an issue with the security device based on the determined absence of the heartbeat from the security device.

8. A method for responding to computer network intrusions, the method comprising:
receiving, by a data processing device including a processor and memory, configuration parameters from a host system, the configuration parameters including instructions for the data processing device to operate as a given type of network asset, intrusion detection signatures, and honeypot detection mechanisms;
generating, by the data processing device, a heartbeat pulse by creating an operational snapshot of the data processing device and transmitting the operational snapshot to the host system;
detecting, by the data processing device, intrusion events based on the configuration parameters;
transmitting, by the data processing device, a notification of the intrusion events to the host system;
determining, by the data processing device, an occurrence of attack associated with the intrusion events; and
initiating, by the data processing device, one or more protective measures.

9. The method of claim 8 wherein the protective measures include one or more of: entering into an isolation state, shutting down, and rebooting to a default state.

10. The method of claim 8 wherein the given type of network asset is selected from a group consisting of: a workstation, a server, and a network-attached device.

11. The method of claim 8 wherein the configuration parameters include one or more of an operating system, a file system structure, port mappings, local credentials, communication protocols, encryption keys, and security routines.

12. The method of claim 8 wherein generating the heartbeat pulse further comprises generating, by the data processing device, a report of device status, activities, and conditions.

13. The method of claim 12 wherein generating a report of device status, activities, and conditions further comprises determining, by the data processing device, a client identifier, a device identifier, a system or configuration file version, a timestamp, device health status, drive space, uptime, a MAC address, and an IP address of the data processing device.

14. The method of claim 12 wherein generating a report of device status, activities, and conditions further comprises:
comparing a hash of passwords and shadow files of the data processing device with a prior hash of the passwords and shadow files;
determining disk utilization of the data processing device;
comparing a hash of files in a filesystem of the data processing device with a prior hash of the files in the filesystem;
retrieving a record of logins;
determining central processing unit utilization of the data processing device; and
determining memory utilization of the data processing device.

15. The method of claim 8 wherein the configuration parameters include one or more system binaries that trigger the protective measures.

16. The method of claim 15 wherein determining the occurrence of attack associated with the intrusion events further comprises detecting the execution of the one or more system binaries.

17. The method of claim 8 wherein determining the occurrence of attack associated with the intrusion events further comprises analyzing file changes associated with the intrusion events.

18. A method for managing computer network intrusions, the method comprising:
configuring, by a host system including at least one processor and a memory, a security device in a network by transmitting configuration parameters to the security device, the configuration parameters including instructions for the security device to operate as a given type of network asset;
monitoring, by the host system, the security device by retrieving and analyzing a heartbeat pulse of the security device, the heartbeat pulse comprising an operational snapshot of the security device and including a report of device status, activities, and conditions, wherein the report includes a comparison of a hash of passwords and shadow files of the security device with a prior hash of the passwords and shadow files, disk utilization, a comparison of a hash of files in a filesystem of the security device with a prior hash of the files in the filesystem, a record of logins, central processing unit utilization, and memory utilization;
determining, by the host system, a change in integrity in the security device based on the monitoring;
sending, by the host system, one or more notification messages to a network administrator based on the determination.

19. The method of claim 18 wherein the given type of network asset is selected from a group consisting of: a workstation, a server, and device network-attached device.

20. The method of claim 18 wherein the configuration parameters include one or more of an operating system, a file system structure, port mappings, local credentials, communication protocols, encryption keys, and security routines.

21. The method of claim 18 further comprising:
determining, by the host system, an absence of the heartbeat from the security device; and
identifying, by the host system an issue with the security device based on the determined absence of the heartbeat from the security device.

22. A method for responding to computer network intrusions, the method comprising:
receiving, by a data processing device including a processor and memory, configuration parameters from a host system, the configuration parameters including instructions for the data processing device to operate as a given type of network asset and one or more system binaries that trigger one or more protective measures;
generating, by the data processing device, a heartbeat pulse by creating an operational snapshot of the data processing device and transmitting the operational snapshot to the host system;

detecting, by the data processing device, intrusion events based on the configuration parameters;

transmitting, by the data processing device, a notification of the intrusion events to the host system;

determining, by the data processing device, an occurrence of attack associated with the intrusion events; and initiating, by the data processing device, the one or more protective measures.

23. The method of claim 22 wherein the protective measures include one or more of: entering into an isolation state, shutting down, and rebooting to a default state.

24. The method of claim 22 wherein the given type of network asset is selected from a group consisting of: a workstation, a server, and a network-attached device.

25. The method of claim 22 wherein the configuration parameters include one or more of an operating system, a file system structure, port mappings, local credentials, communication protocols, encryption keys, and security routines.

26. The method of claim 22 wherein generating the heartbeat pulse further comprises generating, by the data processing device, a report of device status, activities, and conditions.

27. The method of claim 26 wherein generating a report of device status, activities, and conditions further comprises determining, by the data processing device, a client identifier, a device identifier, a system or configuration file version, a timestamp, device health status, drive space, uptime, a MAC address, and an IP address of the data processing device.

28. The method of claim 26 wherein generating a report of device status, activities, and conditions further comprises:

comparing a hash of passwords and shadow files of the data processing device with a prior hash of the passwords and shadow files;

determining disk utilization of the data processing device;

comparing a hash of files in a filesystem of the data processing device with a prior hash of the files in the filesystem;

retrieving a record of logins;

determining central processing unit utilization of the data processing device; and determining memory utilization of the data processing device.

29. The method of claim 22 wherein determining the occurrence of attack associated with the intrusion events further comprises analyzing file changes associated with the intrusion events.

* * * * *